(12) United States Patent
Weng et al.

(10) Patent No.: US 12,050,480 B2
(45) Date of Patent: Jul. 30, 2024

(54) KEY STRUCTURE

(71) Applicant: CHICONY ELECTRONICS CO., LTD., New Taipei (TW)

(72) Inventors: Shin-Chin Weng, New Taipei (TW); Chin-Ping Lin, New Taipei (TW); Shih-Yu Hsu, New Taipei (TW); Liang-Chun Yeh, New Taipei (TW); Bo-Wei Su, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 94 days.

(21) Appl. No.: 18/075,656

(22) Filed: Dec. 6, 2022

(65) Prior Publication Data

US 2024/0036598 A1   Feb. 1, 2024

(30) Foreign Application Priority Data

Jul. 28, 2022  (TW) .................................. 111128414

(51) Int. Cl.
| | | |
|---|---|---|
| *H01H 3/12* | (2006.01) | |
| *G05G 1/02* | (2006.01) | |
| *G06F 3/02* | (2006.01) | |
| *H01H 13/14* | (2006.01) | |

(52) U.S. Cl.
CPC .............. *G05G 1/02* (2013.01); *G06F 3/0202* (2013.01); *H01H 13/14* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | |
|---|---|---|---|
| 10,401,970 B1* | 9/2019 | Chen ..................... | H01H 13/705 |
| 11,107,644 B2* | 8/2021 | Hsieh ....................... | H01H 1/54 |
| 2017/0186569 A1* | 6/2017 | Hsu ........................ | H01H 13/52 |
| 2017/0243707 A1* | 8/2017 | Chao ....................... | H01H 13/14 |
| 2017/0330707 A1* | 11/2017 | Liao ....................... | H01H 3/125 |
| 2019/0131085 A1* | 5/2019 | Yang ........................ | H01H 5/02 |
| 2021/0175028 A1* | 6/2021 | Chan .................... | H01H 13/705 |
| 2022/0044888 A1* | 2/2022 | Yen ...................... | H01H 13/705 |

\* cited by examiner

*Primary Examiner* — Ahmed M Saeed
(74) *Attorney, Agent, or Firm* — Muncy, Geissler, Olds & Lowe, P.C.

(57) ABSTRACT

A key structure includes a baseplate, a keycap and a connecting assembly. The keycap includes a plurality of first pivot portions and a plurality of sliding slots. The connecting assembly includes a first outer frame, two first inner frames, a second outer frame and a second inner frame. The first inner frames are disposed in two accommodating portions of the first outer frame. Two sides of the first outer frame are respectively connected to part of the sliding slots and the baseplate. Two sides of the first inner frame are respectively connected to the first pivot portion and the base plate. Two sides of the second outer frame are respectively connected to part of the sliding slots and the fixing side. Two sides of the second inner frame are respectively pivoted to one of the first inner frames and the base plate.

13 Claims, 5 Drawing Sheets

KEY STRUCTURE

BACKGROUND

1. Technical Field

The disclosure relates to a key structure.

2. Description of the Related Art

A keyboard is commonly used in conjunction with a computer as one of the essential input devices. The keyboard comprises a plurality of key structures. Generally, each of the key structures connects to a keycap and a baseplate by a scissor-type connecting member, which can guide the keycap to move up and down relative to the baseplate. Most keycaps are square, but other shapes are possible according to the functionality of the keys or the layout of the keys on the keyboard. For example, the keycaps of a space bar or other multiple keys are often rectangular or other polygonal shapes.

Because of the large areas of the space bar or other multiple keys of the prior art, if the user only presses on the corner of the keycap, the pressing force cannot be effectively transmitted to the entire keycap, so the switch on the circuit board cannot be triggered effectively. Thus, in addition to the scissor-type connecting member, a metal rod is added to help the entire keycap to move down. In addition, a plurality of scissor-type connecting members and a plurality of metal rods are usually used in a function key in other polygon shapes (here referring to a non-quadrilateral shape) to help the keycap move downward and upward.

However, such metal rods will increase the weight of the keyboard. Furthermore, when the key structure is pressed, noise will be produced by the metal rods hitting the baseplate. There is indeed a need for improvement.

SUMMARY

In view of the above-mentioned problems, the main object of the disclosure is to provide a key structure comprising a connecting assembly having a novel structure to solve the problems of noise and weight caused by the metal rod of the key structure of the prior art.

In order to achieve the above object, the disclosure provides a key structure, which comprises a baseplate, a keycap and a connecting assembly. The keycap has a first area and a second area connected to each other. The keycap comprises a plurality of first pivot portions and a plurality of sliding slots. The first pivot portions are disposed on a side of the first area close to the second area. Part of the sliding slots are disposed in the first area, and part of the sliding slots are disposed in the second area. The connecting assembly comprises a first outer frame, two first inner frames, a second outer frame and a second inner frame. The first outer frame comprises two accommodating portions, and a first movable side and a fixing side opposite to each other. The first movable side is connected to the sliding slots located in the first area, and the fixing side is connected to the baseplate. The two first inner frames are disposed in the two accommodating portions respectively and pivoted to the first outer frame. The two first inner frames respectively comprise a first pivoting side and a second movable side opposite to each other. The first pivoting side is connected to the first pivot portions, and the second movable side is connected to the baseplate. The second outer frame comprises a third movable side and a second pivoting side opposite to each other. The third movable side is connected to the sliding slots located in the second area, and the second pivoting side is pivoted to the fixing side of the first outer frame. The second inner frame is disposed in the second outer frame and pivoted to the second outer frame. The second inner frame comprises a third pivoting side and a fourth movable side opposite to each other. The third pivoting side is connected to one of the two first inner frames, the third pivoting side is pivoted to the first pivoting side, and the fourth movable side is connected to the baseplate.

According to an embodiment of the disclosure, an area of the first area is larger than an area of the second area.

According to an embodiment of the disclosure, a long side of the first outer frame is corresponded to a long side of the first area.

According to an embodiment of the disclosure, the first pivot portions are linearly disposed on a bottom of the keycap.

According to an embodiment of the disclosure, the keycap comprises a plurality of side walls, and the sliding slots are respectively close to a space between the two adjacent side walls.

According to an embodiment of the disclosure, the baseplate comprises a plurality of hooks, and the first outer frame comprises a plurality of first rods disposed on the fixing side. The two first inner frames respectively comprise a plurality of second rods, and the second rods are disposed on the first pivoting side and on the second movable side respectively. The second inner frame comprises a plurality of third rods disposed on the fourth movable side. The hooks respectively fix part of the first rods, the second rods located on the second movable side, and the third rods.

According to an embodiment of the disclosure, the first pivot portions respectively comprise a first pivot hole. Part of the second rods located on the first pivoting side are respectively accommodated in the first pivot holes of the first pivot portions.

According to an embodiment of the disclosure, the second outer frame comprises a plurality of second pivot holes located on the second pivoting side. Part of the first rods of the first outer frame are disposed in the second pivot holes.

According to an embodiment of the disclosure, the second inner frame respectively comprises a plurality of third pivots located on the third pivoting side. Part of the second rods located on the first pivoting side are accommodated in the third pivots.

According to an embodiment of the disclosure, the first outer frame comprises two first guide portions located on the first movable side. The two first guide portions are accommodated in the sliding slots located in the first area.

According to an embodiment of the disclosure, the second outer frame comprises two second guide portions located on the third movable side. The two second guide portions are accommodated in the sliding slots located in the second area.

According to an embodiment of the disclosure, the keycap further comprises a third area, one side of the third area is connected to the first area, and the third area is adjacent to the second area. Part of the sliding slots are disposed in the third area, and part of the first pivot portions are disposed on a side of the first area close to the third area.

According to an embodiment of the disclosure, the connecting assembly further comprises a third outer frame and a third inner frame pivoted to each other. The third outer frame comprises a fifth movable side and a fourth pivoting side opposite to each other. The fifth movable side is connected to the sliding slots located in the third area, and the fourth pivoting side is pivoted to the fixing side of the first outer frame. The third inner frame comprises a fifth pivoting side and a sixth movable side opposite to each other. The fifth pivoting side is connected to the other one of the two first inner frames, the fifth pivoting side and the first pivoting side are pivoted to each other, and the sixth movable side is connected to the baseplate.

In continuation of the description above, the key structure of the disclosure comprises a baseplate, a keycap and connecting assembly. The keycap has a first area and a second area connected to each other, and the keycap comprises a plurality of first pivot portions and a plurality of sliding slots. The connecting assembly comprises a first outer frame, two first inner frames, a second outer frame and a second inner frame. A first movable side of the first outer frame is connected to the sliding slots located in the first area, and the fixing side is connected to the baseplate. The first inner frames and the first outer frame are pivoted to each other. The first pivoting side of the first inner frame is connected to the first pivot portions of the keycap, and the second movable side is connected to the baseplate. The third movable side of the second outer frame is connected to the sliding slots of the second area, and the second pivoting side is pivoted to the fixing side of the first outer frame. The second inner frame and the second outer frame are pivoted to each other, the third pivoting side of the second inner frame is connected to the first pivoting side of one of the first inner frames, and the fourth movable side is connected to the baseplate. According to the structure described above, when the keycap is pressed, the keycap exerts a downward force on the first movable side of the first outer frame and the third movable side of the second outer frame, and the first movable side and the third movable side move toward the outside of the keycap. At the same time, a downward force is applied to the first pivoting side of the first inner frames by the first pivot portions of the keycap, and the third pivoting side of the second inner frame is driven to move down ward such that the second movable sides of the first inner frames and the fourth movable side of the second inner frame move toward the outside of the keycap to complete the downward and upward movements of the key structure. Thus, the key structure can move downward and upward smoothly without the need for a metal rod. Compared with the conventional key structure of the prior art, the key structure of the present invention can achieve the effect of reducing noise and weight.

DETAILED DESCRIPTION OF THE EMBODIMENTS

In order to make the structure, characteristics, and effectiveness of the disclosure further understood and recognized, a detailed description of the disclosure is provided as follows, along with embodiments and accompanying figures.

Figure 1A:
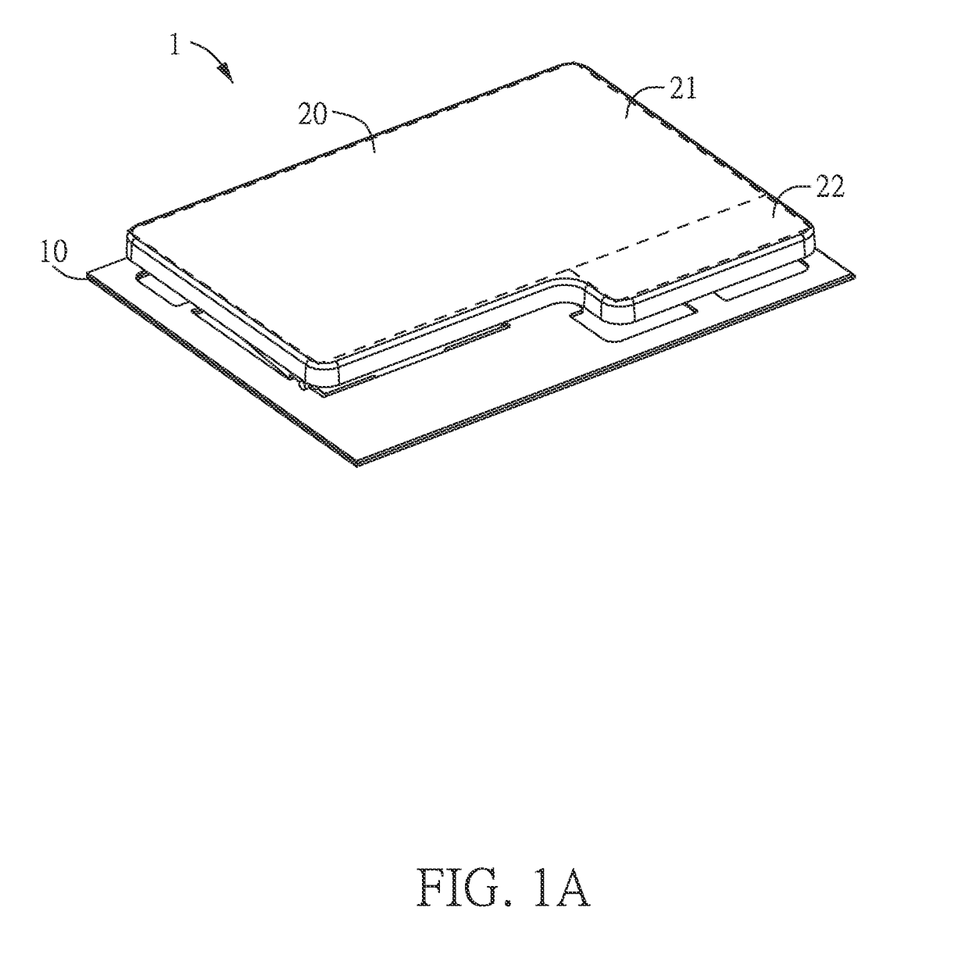
FIG. 1A is a schematic diagram of a key structure according to the first embodiment of the disclosure.
Figure 1B:
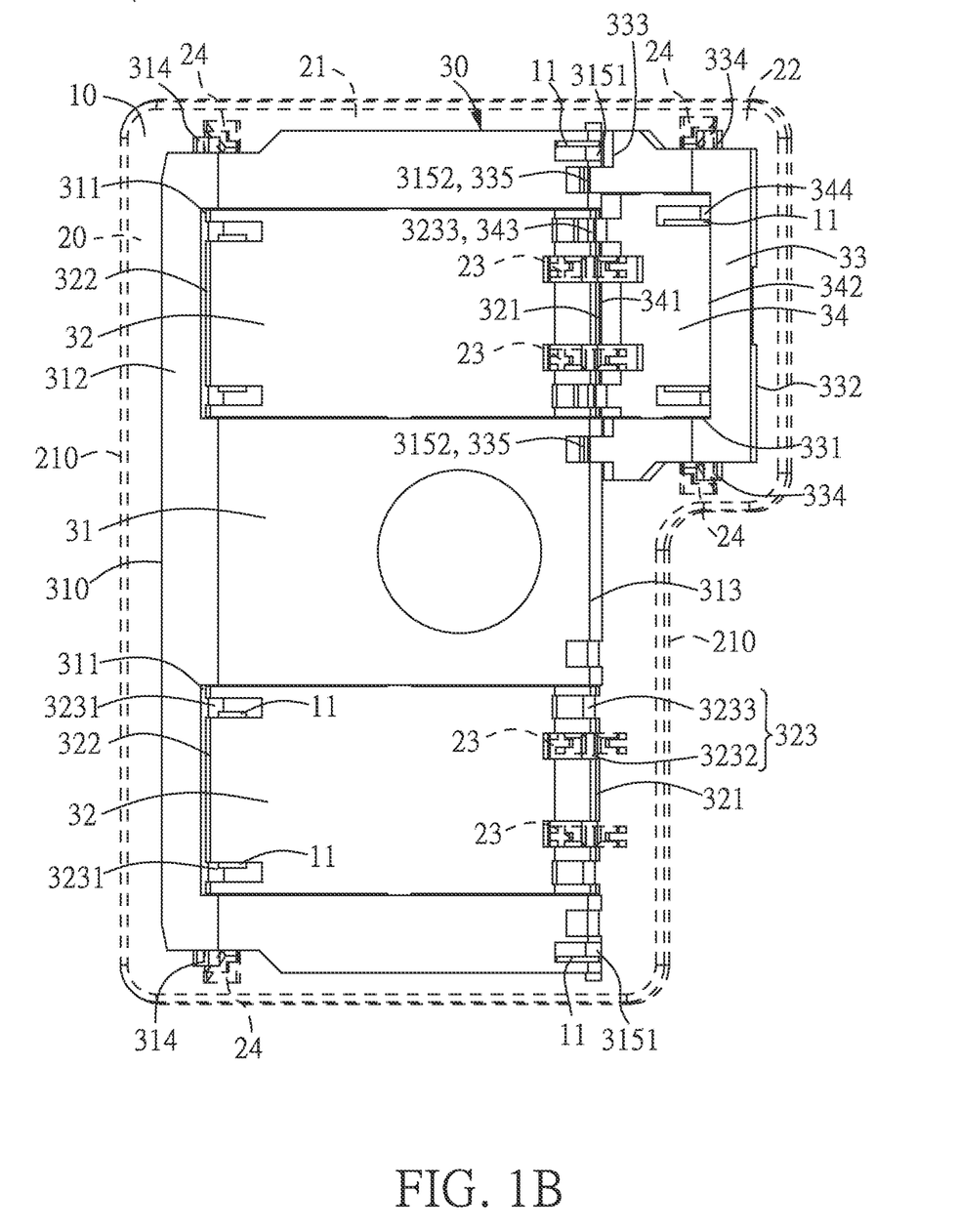
FIG. 1B is a top view of the key structure shown in FIG. 1A.
Figure 2:
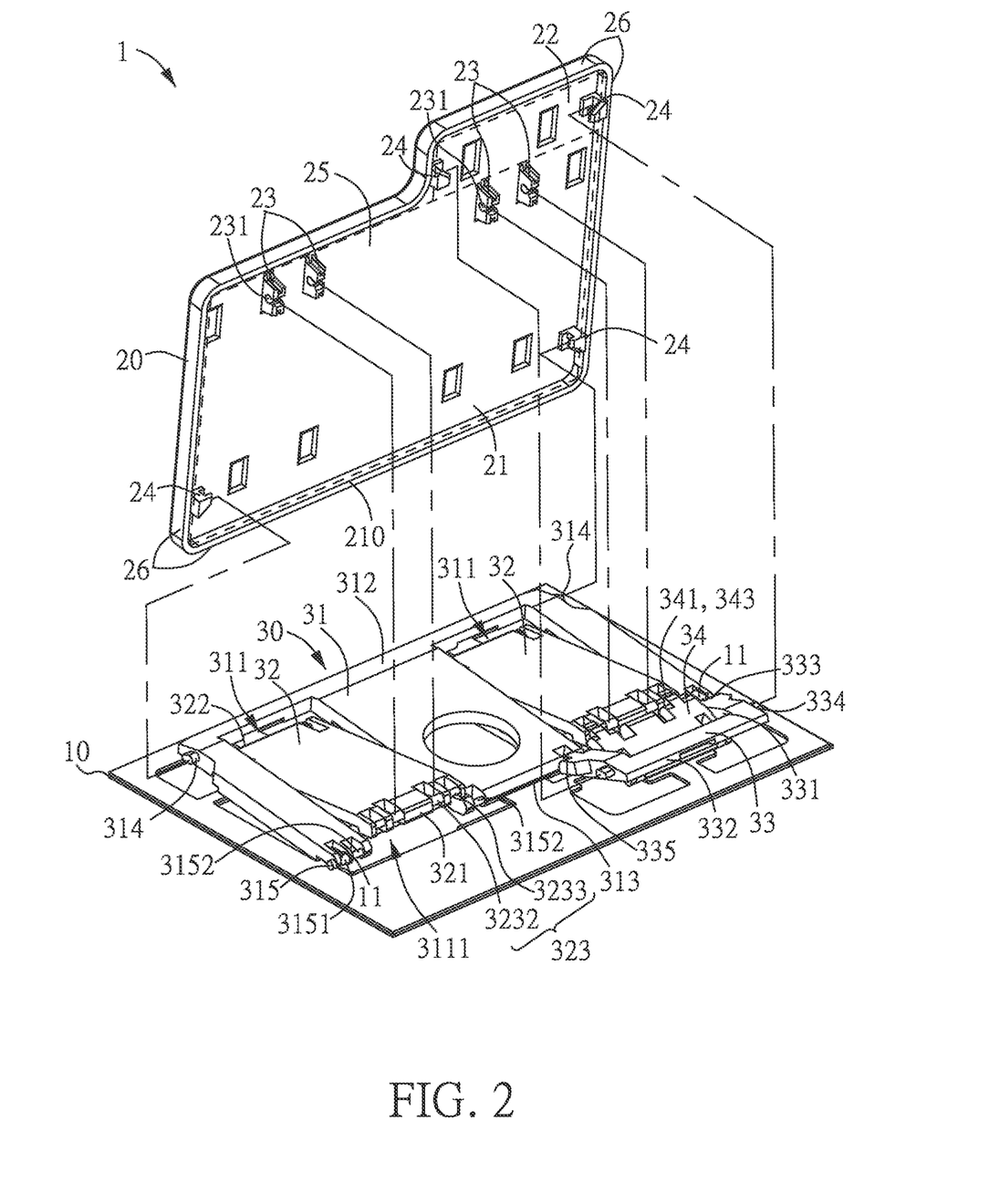
FIG. 2 is a partial exploded schematic diagram of the key structure shown in FIG. 1A.
Figure 3:
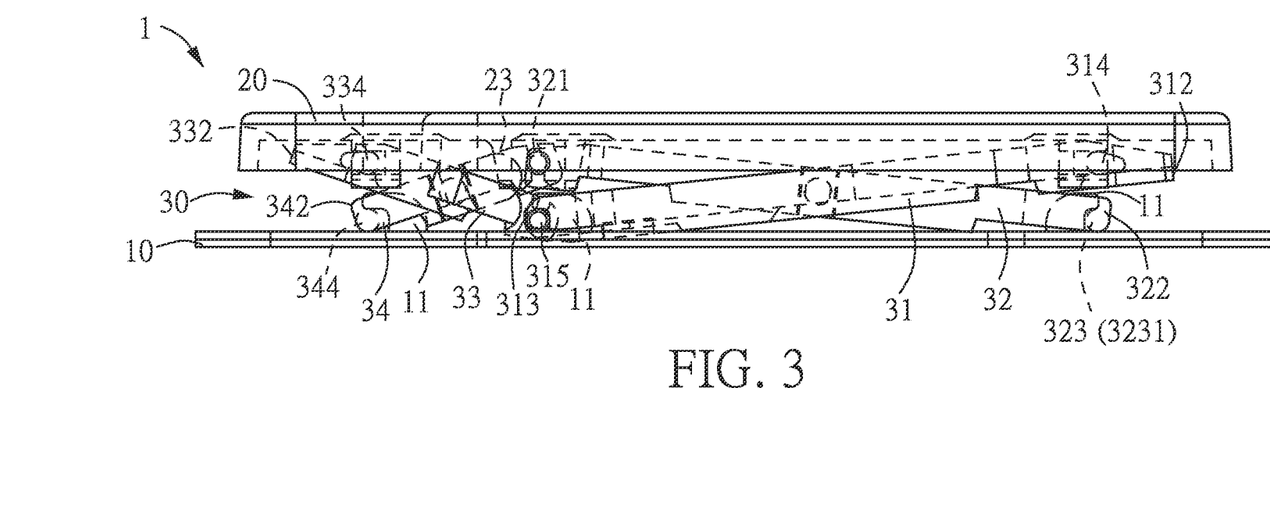
FIG. 3 is a side view of the key structure shown in FIG. 1A.
Figure 4:
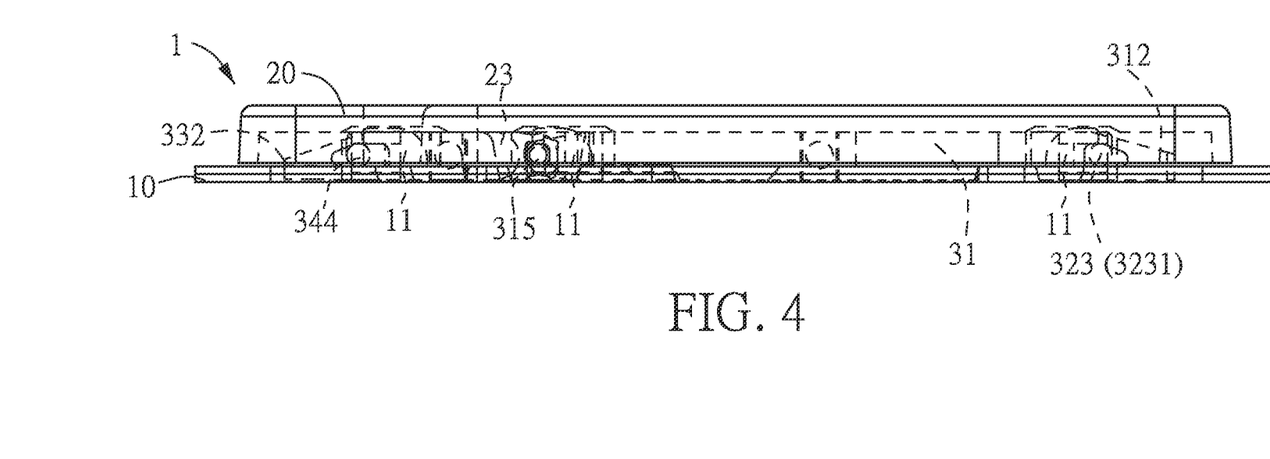
FIG. 4 is a schematic diagram of the keycap shown in FIG. 3 after being pressed.

FIG. 1A is a schematic diagram of a key structure according to the first embodiment of the disclosure; FIG. 1B is a top view of the key structure shown in FIG. 1A; FIG. 2 is a partial exploded schematic diagram of the key structure shown in FIG. 1A; FIG. 3 is a side view of the key structure shown in FIG. 1A; and FIG. 4 is a schematic diagram of the keycap shown in FIG. 3 after being pressed. With reference to FIG. 1A, FIG. 1B and FIG. 2A, the key structure 1 comprises a baseplate 10, a keycap 20 and a connecting assembly 30. It should be noted that the keycap 20 shown in FIG. 1B is represented by a dotted line to show the structures of the connecting assembly 30 and baseplate 10 beneath the keycap 20. The key structure 1 of this embodiment can be a multiple key having a non-quadrilateral shape, and the keycap 20 has a first area 21 and a second area 22 connected to each other, such as the areas enclosed by dotted lines shown in FIG. 1A and FIG. 2. In this embodiment, the first area 21 and the second area 22 are both rectangular, and an area of the first area 21 is larger than an area of the second area 22. Furthermore, one of the long sides 210 of the first area 21 extends outward from the second area 22, thereby forming the keycap 20 having a non-quadrilateral shape.

The keycap 20 comprises a plurality of first pivot portions 23 and a plurality of sliding slots 24. In this embodiment, the keycap 20 comprises four first pivot portions 23; preferably, the first pivot portions 23 are linearly disposed on a bottom 25 of the keycap 20 and located on a side of the first area 21 adjacent to the second area 22. Two of the first pivot portions 23 are disposed on the side of the first area 21 adjacent to the second area 22, and the other two first pivot portions 23 are disposed on the bottom 25 of the first area 21 which is not adjacent to the second area 22. In other words, two of the first pivot portions 23 are disposed on the left side of the bottom 25, and the other two first pivot portions 23 are disposed on the right side of the bottom 25. It should be noted that, when implementing the key structure of the present disclosure, the position and spacing of the first pivoting portion can be adjusted according to requirements, and the present disclosure is not limited thereto.

In addition, part of the sliding slots 24 are disposed in the first area 21, and part of the sliding slots 24 are disposed in the second area 22. Specifically, the keycap 20 of this embodiment comprises four sliding slots 24, two of which are disposed in the first area 21 and the other two of which are disposed in the second area 22. Preferably, the sliding slots 24 are respectively close to a space between the two adjacent side walls 26. In other words, the sliding slots 24 of this embodiment are respectively located at the corners of the first area 21 or the second area 22.

The connecting assembly 30 is used to connect the keycap 20 and the baseplate 10 such that the keycap will 20 move up and down relative to the baseplate 10. The connecting assembly 30 of this embodiment comprises two sets of scissor-type connecting members; specifically, the connecting assembly 30 comprises a first outer frame 31, a second outer frame 33, two first inner frames 32 and a second inner frame 34. The first inner frames 32 are pivoted to the first outer frame 31 respectively, and the second inner frame 34 is pivoted to the second outer frame 33. The first outer frame 31 and the first inner frames 32 are corresponded to the first area 21 of the keycap 20, and the second outer frame 33 and the second inner frame 34 are corresponded to the second area 22 of the keycap 20. Preferably, a long side 310 of the first outer frame 31 is corresponded to the long side 210 of the first area 21. In other words, the long axis direction of the keycap 20 is parallel to the long axis direction of the first outer frame 31.

In this embodiment, the first outer frame 31 comprises two accommodating portions 311, a first movable side 312 and a fixing side 313 opposite to each other. First, the specific structure of the first outer frame 31 is described below. The accommodating portions 311 respectively have an open end 3111 toward the second area 22, as shown in FIG. 2. That is, the open ends 3111 of the accommodating portions 311 face toward the second area 22. The two first inner frames 32 are respectively disposed in the two accommodating portions 311 and pivoted to the first outer frame 31.

In this embodiment, the first movable side 312 (i.e., the long side 310 of the first outer frame 31 opposite to the second outer frame 33) is a long plate structure, which has higher structural strength than the open end 3111. The first movable side 312 connects to the bottom 25 of the keycap 20 to facilitate the transmission of force when the user presses the keycap 20. Specifically, the first movable side 312 is connected to the sliding slots 24 located in the first area 21. In this embodiment, the first outer frame 31 comprises two first guide portions 314 located on the first movable side 312. Preferably, the first guide portions 314 are shafts extending outward from two sides of the first outer frame 31. The first guide portions 314 may be disposed at the short side walls of the first outer frame 31 and close to the first movable side 312. Furthermore, the first guide portions 314 are accommodated in the sliding slots 24 located in the first area 21. When the keycap 20 moves up and down relative to the baseplate 10, the first guide portions 314 can move within the sliding slots 24.

Moreover, the fixing side 313 is connected to the baseplate 10. Specifically the baseplate 10 comprises a plurality of hooks 11 to limit the positions of the first outer frame 31, the first inner frames 32 and one side of the second inner frame 34. Part of the hooks 11 fasten the fixing side 313 of the first outer frame 31. In this embodiment, the first outer frame 31 comprises a plurality of first rods 315 disposed on the fixing side 313. As shown in FIG. 2, preferably, part of the first rods 315 may be used as connecting rods 3151 to connect to the hooks 11 of the baseplate 10, and part of the first rods 315 may be used as pivots 3152 to connect to the second outer frame 33 (details described below). For the sake of drawing simplicity, the first rods 315, connecting rods 3151 and pivots 3152 are only marked on the right side of the first outer frame 31 in FIG. 2. In this embodiment, the hooks 11 press against the upper edge of part of the first rods 315 (i.e., the connecting rods 3151) such that the fixing side 313 of the first outer frame 31 is connected to the baseplate 10. When the keycap 20 moves up and down relative to the baseplate 10, part of the first rods 315 (i.e., the connecting rods 3151) rotate in the hooks 11 so that the first outer frame 31 can move up and down smoothly. It should be noted that the keycap 20 has a groove corresponding to the position of the hooks 11, but the groove is omitted in FIG. 1B to show the structure of the hooks 11 pressing against the connecting rods 3151).

In addition, the two first inner frames 32 respectively comprise a first pivoting side 321 and a second movable side 322 opposite to each other. The first pivoting side 321 is connected to the first pivot portions 23 of the keycap 20, and the second movable side 322 is connected to the baseplate 10. Specifically, the first inner frames 32 respectively comprise a plurality of second rods 323, and the second rods 323 are respectively disposed on the first pivoting side 321 and the second movable side 322. It should be noted that the plurality of second rods 323 can also be used as connecting rods 3231 and pivots 3232, 3233, respectively, as shown in FIG. 1B. The connecting rods 3231 are located on the second movable side 322, and the pivots 3232, 3233 are located on the first pivoting side 321. In addition, the structures of the pivots 3232, 3233 are illustrated in the right side of FIG. 2, and the structures of the connecting rods 3231 are illustrated in FIG. 3.

The pivots 3232 of the first inner frames 32 are pivoted to the keycap 20, and the pivots 3233 are pivoted to the second inner frame 34 (details described below). As shown in FIG. 2, in this embodiment, the first pivot portions 23 respectively comprise a first pivot hole 231 such that part of the second rods 323 (i.e., the pivots 3232) located on the first pivoting side 321 can be respectively accommodated in the first pivot holes 231, and the first pivoting sides 321 of the first inner frames 32 are pivoted to the keycap 20. Preferably, the first pivot hole 231 is a hole in a drop shape to facilitate the assembly of part of the second rods 323 (i.e., the pivots 3232) into the first pivot hole 231. Similarly, part of the hooks 11 of the baseplate 10 may press the upper edge of the second rods 323 (i.e., the connecting rods 3231) located on the second movable side 322, as shown in FIG. 3, such that the second movable side 322 of the first inner frames 32 can be connected to the baseplate 10. When the keycap 20 moves up and down relative to the baseplate 10, part of the second rods 323 (i.e., the connecting rods 3231) move toward the outside of the hooks 11, and part of the second rods 323 (i.e., the pivots 3232) rotate in the first pivot hole 231 so that the first inner frames 32 can move up and down smoothly.

The second outer frame 33 comprises an accommodating portion 331, and the open end of the accommodating portion 331 faces the first outer frame 31. The second inner frame 34 is disposed in the accommodating portion 331 of the second outer frame 33 and pivoted to the second outer frame 33. The second outer frame 33 further comprises a third movable side 332 and a second pivoting side 333 opposite to each other, and the second pivoting side 333 faces the first outer frame 31. In this embodiment, the third movable side 332 is a long plate structure, and the third movable side 332 is connected to the bottom 25 of the keycap 20 to facilitate the transmission of force when the user presses the keycap 20. The second pivoting side 333 is pivoted to the fixing side 313 of the first outer frame 31. The third movable side 332 of the second outer frame 33 is connected to the sliding slots 24 located in the second area 22. In this embodiment, the second outer frame 33 comprises two second guide portions 334 located on the third movable side 332. Preferably, the second guide portions 334 may be disposed at the short side walls of the second outer frame 33 and close to third movable side 332. The second guide portions 334 are accommodated in the sliding slots 24 located in the second area 22. When the keycap 20 moves up and down relative to the baseplate 10, the second guide portions 334 can also move within the sliding slots 24.

In addition, the second pivoting side 333 of the second outer frame 33 is pivoted to the fixing side 313 of the first outer frame 31. Specifically, the second outer frame 33 comprises a plurality of the second pivot holes 335 located on the second pivoting side 333. Part of the first rods 315 (i.e., the pivots 3152) of the first outer frame 31 are accommodated in the second pivot holes 335. In other words, the pivots 3152 of the first outer frame 33 are engaged within the second pivot holes 335. It should be noted that the pivots 3152 are engaged within the second pivot holes 335, so the pivots 3152 and the second pivot holes 335 shown in FIG. 1B are marked at the same position. Furthermore, the hole of the second pivot hole 335 is covered in FIG. 2, so the second pivot holes 335 are marked on the outer side of one of the second pivot holes 335.

In this embodiment, the second inner frame 34 comprises a third pivoting side 341 and a fourth movable side 342 opposite to each other. The third pivoting side 341 is connected to one of the first inner frames 32, the third pivoting side 341 is pivoted to the first pivoting side 321, and the fourth movable side 342 is connected to the baseplate 10. Specifically, the second inner frame 34 comprises a plurality of third pivots 343 located on the third pivoting side 341. The third pivoting side 341 and the third pivots 343 shown in FIG. 2 are marked at the same position. Furthermore, part of the second rods 323 (i.e., the pivots 3233) of the first inner frames 32 located on the first pivoting side 321 are accommodated in the third pivots 343 such that the third pivoting side 341 of the second inner frame 34 can be pivoted to the first pivoting sides 321 of the first inner frames 32.

Furthermore, the second inner frame 34 comprises a plurality of third rods 344 located on the fourth movable side 342. In this embodiment, part of the hooks 11 of the baseplate 10 press against the third rods 344 of the second inner frame 34 such that the fourth movable side 342 of the second inner frame 34 can be connected to the baseplate 10. When the keycap 20 is pressed, the third rods 344 move toward the outside of the hooks 11 and the pivots 3233 rotate in the third pivots 343.

The above-mentioned rods (i.e., the connecting rods 3151, the connecting rods 3231, the pivots 3232, 3233 and the third rods 344) and the above-mentioned pivot holes (i.e., the first pivot hole 231, the second pivot holes 335 and the third pivots 343) are preferred embodiments of the present disclosure. In other embodiments, the structures of the rods and the pivot holes may be replaced with each other, or other pivot structures (e.g., a universal shaft) may be used; the present disclosure is not limited thereto.

In this embodiment, the hooks 11 of the baseplate 10 respectively fasten the fixing side 313 of the first outer frame 31, the second movable side 322 of the first inner frames 32 and the fourth movable side 342 of the second inner frame 34. The keycap 20 is connected to the first pivoting sides 321 of the first inner frames 32 through the first pivot portions 23 and is also connected to the first movable side 312 of the first outer frame 31 and the third movable side 332 of the second outer frame 33 through the sliding slots 24. Furthermore, the second pivoting side 333 of the second outer frame 33 is pivoted to the fixing side 313 of the first outer frame 31, and the first pivoting side 321 of the first inner frame 32 is pivoted to the third pivoting side 341 of the second inner frame 34. The first pivot portions 23 are linearly disposed on the bottom 25 of the keycap 20 such that the fixing side 313 of the first outer frame 31, the second pivoting side 333 of the second outer frame 33, the first pivoting sides 321 of the first inner frames 32 and the third pivoting side 341 of the second inner frame 34 are pivotally connected to each other in a linear configuration in the orthographic projection of the baseplate 10. Thus, when the keycap 20 is pressed, the fixing side 313, the second pivoting side 333, the first pivoting side 321 and the third pivoting side 341 pivot on the same line to drive the keycap 20 to move up and down.

Please refer to FIG. 1B, FIG. 2, FIG. 3 and FIG. 4. With the structures described above, when the keycap 20 is pressed, the keycap 20 exerts downward force on the first movable side 312 of the first outer frame 31 and the third movable side 332 of the second outer frame 33 such that the first guide portions 31 and the second guide portions 334 move toward the outside of the keycap 20 within the sliding slots 24. At the same time, the first pivot portions 23 of the keycap 20 exert downward force on the first pivoting sides 321 of the first inner frames 32. Correspondingly, the second movable sides 322 of the first inner frames 32 also move toward the outside of the keycap 20. Furthermore, because the third pivoting side 341 of the second inner frame 34 and the first pivoting sides 321 of the first inner frames 32 are pivoted to each other, the third pivoting side 341 can also be driven to move downward at the same time, and the fourth movable side 342 moves toward the outside of the keycap 20 to complete the downward and upward movements of the key structure 1. Due to the structures of the connecting assembly 30 comprising the first outer frame 31, the first inner frames 32, the second outer frame 33 and the second inner frame 34, and the connection described above, the key structure 1 can move downward and upward smoothly without the need for a metal rod. Furthermore, the sliding slots 24 are disposed on the space between the two adjacent side walls 26; that is, the sliding slots 24 are close to the corner of the keycap 20. Furthermore, the first pivot portions 23 are disposed on one side of the first area 21 close to the second area 22. Thus, no matter where the keycap 20 is pressed, the force can be effectively transmitted to the connecting assembly 30. In addition, the first pivot portions 23 are linearly disposed on a bottom 25 of the keycap 20, the first outer frame 31 and the second outer frame 33 are pivoted to each other, and the first inner frames 32 and the second inner frame 34 are pivoted to each other such that the connecting assembly 30 can achieve a compact configuration, and the space under the keycap 20 can be efficiently used, which is more conducive to the transmission of the pressing force.

Figure 5:
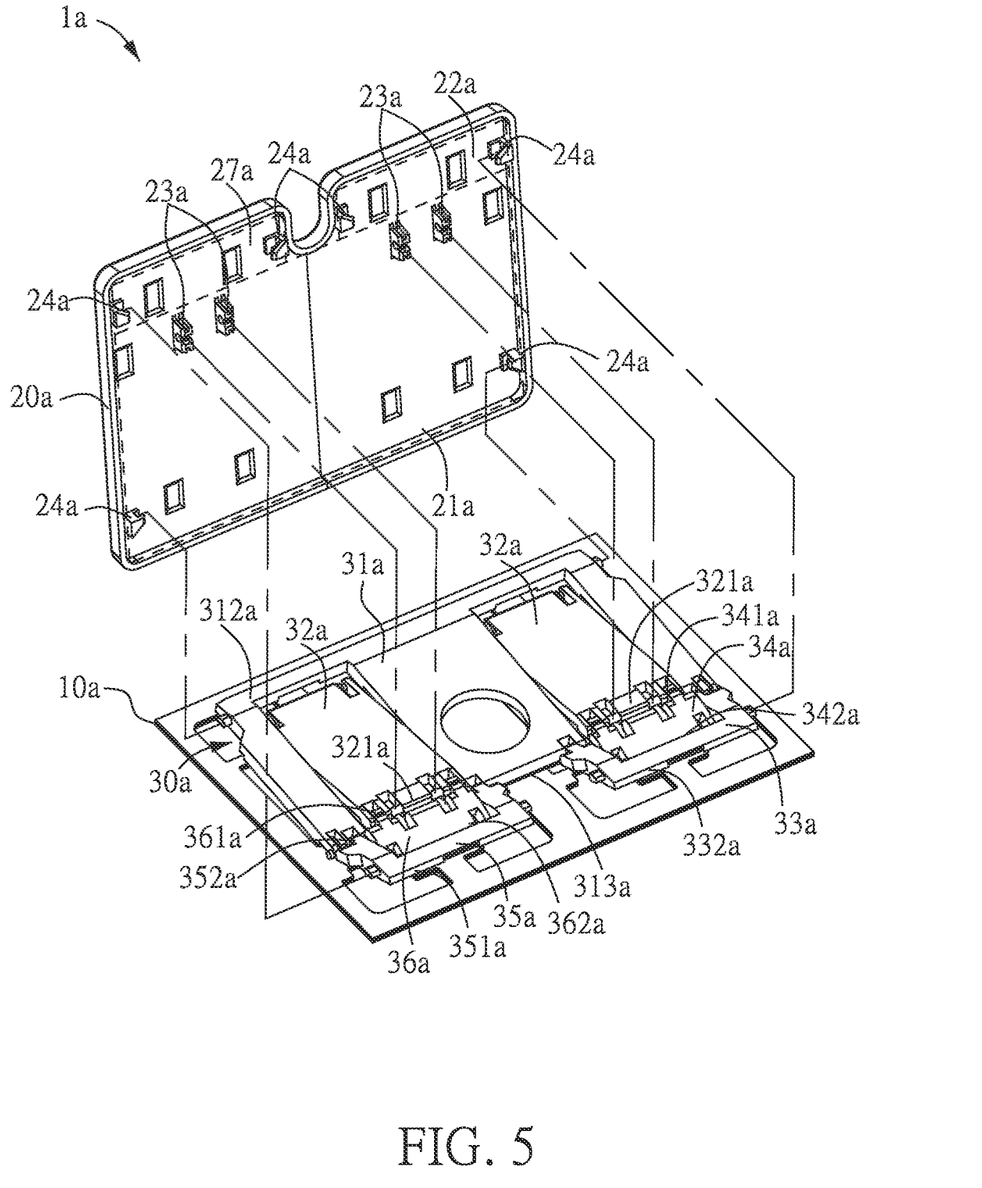
FIG. 5 is a schematic diagram of a key structure according to the second embodiment of the disclosure.

Please refer to FIG. 5. FIG. 5 is a schematic diagram of a key structure according to the second embodiment of the disclosure. The difference from the first embodiment is that the key structure 1a of this embodiment has a quadrilateral-like shape. Correspondingly, in addition to the first area 21a and the second area 22a, the keycap 20a further comprises a third area 27a; in FIG. 5, it is the area enclosed by the dotted line. One side of the third area 27a is connected to the first area 21a, and the third area 27a is adjacent to the second area 22a. In this embodiment, the second area 22a and the third area 27a are disposed side by side, and the second area 22a and one side of the third area 27a are respectively communicated with the first area 21a.

Furthermore, the keycap 20a also comprises a plurality of first pivot portions 23a and a plurality of sliding slots 24a. Specifically, the keycap 20a of this embodiment also comprises four first pivot portions 23a. Two of the first pivot portions 23a are disposed between the first area 21a and the second area 22a, and the other two first pivot portions 23a are disposed between the first area 21a and the third area 27a. In other words, part of the first pivot portions 23a are disposed on one side of the first area 21a close to the second area 22a, and part of the first pivot portions 23 are disposed on one side of the first area 21a close to the third area 27a. In addition, the keycap 20a of this embodiment comprises six sliding slots 24a. The first area 21a, the second area 22a and the third area 27a respectively have two of the sliding slots 24a.

In this embodiment, the connecting assembly 30a comprises three sets of scissor-type connecting members. That is, in addition to the first outer frame 31a, the first inner frames 32a, the second outer frame 33a and the second inner frame 34a, the connecting assembly 30a further comprises a third outer frame 35a and the third inner frame 36a pivotally connected to each other. The first outer frame 31a are respectively connected to the third outer frame 35a and the fixing side 313 of the first outer frame 31a, and the two first inner frames 32a are respectively connected to the second inner frame 34a and the third inner frame 36a. The structures and connections of the first outer frame 31a, the first inner frames 32a, the second outer frame 33a and the second inner frame 34a are the same as those the first embodiment, so they will not be further described in detail. Preferably, the structure of the third outer frame 35a may be the same as that of the second outer frame 33a, and the structure of the third inner frame 36a may be the same as that of the second inner frame 34a.

In this embodiment, the third outer frame 35a comprises a fifth movable side 351a and a fourth pivoting side 352a opposite to each other. The fifth movable side 351a is connected to the keycap 20a, and similarly, the fifth movable side 351a is connected to the sliding slots 24a located in the third area 27a. Furthermore, the fourth pivoting side 352a is pivoted to the fixing side 313a of the first outer frame 31a. In addition, the third inner frame 36a comprises a fifth pivoting side 361a and a sixth movable side 362a opposite to each other. The fifth pivoting side 361a is pivotally connected to the first pivoting side 321a of the first inner frames 32a, and the sixth movable side 362a is connected to the baseplate 10a.

When the keycap 20a is pressed, the keycap 20a exerts downward force on the first movable side 312a of the first outer frame 31a, the third movable side 332a of the second outer frame 33a and the fifth movable side 351a of the third outer frame 35a such that the first movable side 312a, the third movable side 332a and the fifth movable side 351a can move toward the outside of the keycap 20a. At the same time, the first pivot portions 23a of the keycap 20a exert downward force on the first pivoting side 321a of the two first inner frames 32a such that the third pivoting side 341a of the second inner frame 34a and the fifth pivoting side 361a of the third inner frame 36a can be driven to move downward. At the same time, the fourth movable side 342a of the second inner frame 34a and the sixth movable side 362a of the third inner frame 36a move toward the outside of the keycap 20a to complete the downward and upward movements of the key structure 1a. In this embodiment, because the structures of the connecting assembly 30a comprise the first outer frame 31a, the first inner frames 32a, the second outer frame 33a, the second inner frame 34a, the third outer frame 35a and the third inner frame 36a, and because of the connection described above, the key structure 1a having a quadrilateral-like shape can also move downward and upward smoothly without the need for a metal rod.

In continuation of the description above, the key structure of the disclosure comprises a baseplate, a keycap and connecting assembly. The keycap has a first area and a second area connected to each other, and the keycap comprises a plurality of first pivot portions and a plurality of sliding slots. The connecting assembly comprises a first outer frame, two first inner frames, a second outer frame and a second inner frame. A first movable side of the first outer frame is connected to the sliding slots located in the first area, and the fixing side is connected to the baseplate. The first inner frames and the first outer frame are pivoted to each other. The first pivoting side of the first inner frames are connected to the first pivot portions of the keycap, and the second movable side is connected to the baseplate. The third movable side of the second outer frame is connected to the sliding slots of the second area, and the second pivoting side is pivoted to the fixing side of the first outer frame. The second inner frame and the second outer frame are pivoted to each other, the third pivoting side of the second inner frame is connected to the first pivoting side of one of the first inner frames, and the fourth movable side is connected to the baseplate. According to the structure described above, when the keycap is pressed, the keycap exerts a downward force on the first movable side of the first outer frame and the third movable side of the second outer frame, and the first movable side and the third movable side move toward the outside of the keycap. At the same time, a downward force is applied to the first pivoting side of the first inner frames by the first pivot portions of the keycap, and the third pivoting side of the second inner frame is driven to move downward such that the second movable side of the first inner frames and the fourth movable side of the second inner frame move toward the outside of the keycap to complete the downward and upward movements of the key structure. Thus, the key structure can move downward and upward smoothly without the need for a metal rod. Compared with the conventional key structure of the prior art, the key structure of the present invention can achieve the effect of reducing noise and weight.

In addition, the first pivot portions are linearly disposed on a bottom of the keycap, the first outer frame and the second outer frame are pivoted to each other, and the first inner frames and the second inner frame are pivoted to each other such that the connecting assembly can achieve a compact configuration, and the space under the keycap can be efficiently used, which is more conducive to the transmission of the pressing force.

It is noted that the above-described embodiments are merely illustrative of preferred embodiments of the disclosure, and that in order to prevent redundancy, not all possible combinations of the variations are described in detail; various changes and modifications may be made to the described embodiments without departing from the scope of the disclosure as described by the appended claims.

What is claimed is:

1. A key structure, comprising:
   a baseplate;
   a keycap having a first area and a second area connected to each other, the keycap comprising a plurality of first pivot portions and a plurality of sliding slots, the first pivot portions being disposed on a side of the first area close to the second area, part of the sliding slots being disposed in the first area, and part of the sliding slots being disposed in the second area; and
   a connecting assembly, comprising:
      a first outer frame comprising two accommodating portions, and a first movable side and a fixing side opposite to each other, the first movable side being connected to the sliding slots located in the first area, and the fixing side being connected to the baseplate;
      two first inner frames disposed in the two accommodating portions respectively and pivoted to the first outer frame, the two first inner frames respectively comprising a first pivoting side and a second movable side opposite to each other, the first pivoting side being connected to the first pivot portions, and the second movable side being connected to the baseplate;
      a second outer frame comprising a third movable side and a second pivoting side opposite to each other, the third movable side being connected to the sliding slots located in the second area, and the second pivoting side being pivoted to the fixing side of the first outer frame; and a second inner frame disposed in the second outer frame and pivoted to the second outer frame, the second inner frame comprising a third pivoting side and a fourth movable side opposite to each other, the third pivoting side being connected to one of the two first inner frames, the third pivoting side being pivoted to the first pivoting side, and the fourth movable side being connected to the baseplate.

2. The key structure as claimed in claim 1, wherein an area of the first area is larger than an area of the second area.

3. The key structure as claimed in claim 1, wherein a long side of the first outer frame is corresponded to a long side of the first area.

4. The key structure as claimed in claim 1, wherein the first pivot portions are linearly disposed on a bottom of the keycap.

5. The key structure as claimed in claim 1, wherein the keycap comprises a plurality of side walls, and the sliding slots are respectively close to a space between the two adjacent side walls.

6. The key structure as claimed in claim 1, wherein the baseplate comprises a plurality of hooks, the first outer frame comprises a plurality of first rods disposed on the fixing side, the two first inner frames respectively comprise a plurality of second rods, the second rods are disposed on the first pivoting side and the second movable side respectively, the second inner frame comprises a plurality of third rods disposed on the fourth movable side, and the books respectively fix part of the first rods, the second rods located on the second movable side, and the third rods.

7. The key structure as claimed in claim 6, wherein the first pivot portions respectively comprise a first pivot hole, and part of the second rods located on the first pivoting side are respectively accommodated in the first pivot hole of the first pivot portions.

8. The key structure as claimed in claim 6, wherein the second outer frame comprises a plurality of second pivot holes located on the second pivoting side, and part of the first rods of the first outer frame are disposed in the second pivot holes.

9. The key structure as claimed in claim 6, wherein the second inner frame respectively comprises a plurality of third pivots located on the third pivoting side, and part of the second rods located on the first pivoting side are accommodated in the third pivots.

10. The key structure as claimed in claim 1, wherein the first outer frame comprises two first guide portions located on the first movable side, and the two first guide portions are accommodated in the sliding slots located in the first area.

11. The key structure as claimed in claim 1, wherein the second outer frame comprises two second guide portions located at the third movable side, and the two second guide portions are accommodated in the sliding slots located in the second area.

12. The key structure as claimed in claim 1, wherein the keycap further comprises a third area, one side of the third area is connected to the first area, the third area is adjacent to the second area, part of the sliding slots are disposed in the third area, and part of the first pivot portions are disposed on a side of the first area close to the third area.

13. The key structure as claimed in claim 12, wherein the connecting assembly further comprises a third outer frame and a third inner frame pivoted to each other, the third outer frame comprises a fifth movable side and a fourth pivoting side opposite to each other, the fifth movable side is connected to the sliding slots located in the third area, the fourth pivoting side is pivoted to the fixing side of the first outer frame, the third inner frame comprises a fifth pivoting side and a sixth movable side opposite to each other, the fifth pivoting side is connected to the other one of the two first inner frames, the fifth pivoting side and the first pivoting side are pivoted to each other, and the sixth movable side is connected to the baseplate.

* * * * *